US011113627B2

(12) United States Patent
Levy

(10) Patent No.: US 11,113,627 B2
(45) Date of Patent: Sep. 7, 2021

(54) CHARACTERISATION OF DATA SETS CORRESPONDING TO DYNAMICAL STATISTICAL SYSTEMS USING MACHINE LEARNING

(71) Applicant: Noble Artificial Intelligence, Inc., Newark, DE (US)

(72) Inventor: Matthew Chase Levy, San Francisco, CA (US)

(73) Assignee: NOBLE ARTIFICIAL INTELLIGENCE, INC., Newark, DE (US)

( * ) Notice: Subject to any disclaimer, the term of this patent is extended or adjusted under 35 U.S.C. 154(b) by 944 days.

(21) Appl. No.: 15/835,265

(22) Filed: Dec. 7, 2017

(65) Prior Publication Data
US 2018/0157994 A1   Jun. 7, 2018

(30) Foreign Application Priority Data
Dec. 7, 2016 (GB) ...................................... 1620820

(51) Int. Cl.
*G06N 20/00* (2019.01)
*G06F 30/20* (2020.01)
*G06F 111/10* (2020.01)

(52) U.S. Cl.
CPC ............. *G06N 20/00* (2019.01); *G06F 30/20* (2020.01); *G06F 2111/10* (2020.01)

(58) Field of Classification Search
CPC ...... G06N 20/00; G06F 30/20; G06F 2111/10
See application file for complete search history.

(56) References Cited

U.S. PATENT DOCUMENTS

| 7,228,239 B1* | 6/2007 | Cetto .................. H01J 49/0036 436/171 |
| 9,311,609 B2* | 4/2016 | Marcheret ................ G06N 7/00 |
| (Continued) | | |

FOREIGN PATENT DOCUMENTS

| KR | 101524260 | 5/2015 |
| WO | 2015/154089 | 10/2015 |

OTHER PUBLICATIONS

Notification of Transmittal of the International Search Report and the Written Opinion of the International Searching Authority, or the Declaration, including International Search Report and Written Opinion, PCT/US2017/065183, dated Feb. 7, 2018.

(Continued)

*Primary Examiner* — Michael Jung
(74) *Attorney, Agent, or Firm* — Bryan Cave Leighton Paisner LLP

(57) ABSTRACT

Machine learning is performed on input data representing a dynamical statistical system of entities having plural primary variables that vary time. A distribution function over time of the density of entities in a phase space, whose dimensions are the primary variables and secondary variables dependent on the rate of change of the primary variables, is derived and encoded as a sum of contour functions over time describing the contour in phase space of plural phaseons which are entities of a model of the dynamical statistical system that are localised in the phase space. Machine learning is performed on the encoded distribution function and/or at least one field in the effective configuration space whose dimensions are the primary variables, derived from the encoded distribution function. The encoding of the distribution function provides a representation which improves the performance of the machine learning techniques by simplifying hyperparameter optimisation.

21 Claims, 10 Drawing Sheets

(56) References Cited

U.S. PATENT DOCUMENTS

| | | |
|---|---|---|
| 2007/0214098 A1* | 9/2007 | Ho .................. H01L 22/26 706/18 |
| 2009/0016599 A1 | 1/2009 | Eaton et al. |
| 2016/0055125 A1* | 2/2016 | Razavi ............. G06Q 10/067 703/2 |
| 2016/0078657 A1 | 3/2016 | McCord |
| 2016/0188768 A1 | 6/2016 | Gopalakrishnan et al. |

OTHER PUBLICATIONS

Morabito, et al. "Plasma Evolution Control with Neuro-Fuzzy Techniques," In Control Conference (ECC), 1999 European (pp. 4188-4192) 1999.

Zhang, et al. "Detecting Temporal Patterns Using Reconstructed Phase Space and Support Vector Machine in the Dynamic Data System," Information and Automation (ICIA), 2011.

Frederiksen, et al. "Particle Control in Phase Space by Global K-Means Clustering," Arxiv.org, Cornell University Library, Apr. 15, 2015.

Haugbolle, et al. "Photon-Plasma: a modern high-order particle-in-cell code," Physics of Plasmas, Nov. 22, 2012.

Alapati, et al. "Combining Clustering with Classification: A Technique to Improve Classification Accuracy," International Journal of Computer Science Engineering, vol. 5, Nov. 1, 2016.

* cited by examiner

CHARACTERISATION OF DATA SETS CORRESPONDING TO DYNAMICAL STATISTICAL SYSTEMS USING MACHINE LEARNING

CROSS-REFERENCE TO RELATED APPLICATIONS

This application claims the benefit of, and priority to, United Kingdom Patent Application No. GB 1620820.9 filed on Dec. 7, 2016 in the Intellectual Property Office of the United Kingdom, the content of which is incorporated by reference in its entirety.

TECHNICAL FIELD

The present invention relates to the use of machine learning for characterising dynamical statistical systems of entities having plural primary variables that vary with time.

BACKGROUND

Many important areas of science, economics, research, and development advance by better understanding the evolution of dynamical statistical systems. An extremely broad range of systems, both physical and non-physical, can be described as "dynamical statistical systems," including fusion plasma physics, atmospheric flows involved in airplane flight, evolution of aggregated asset prices in financial markets, and many more. In some basic systems, the dominant processes are evident and therefore can be studied using direct analysis or experimentation, enabling rapid advances. However in a very large number of topical systems, e.g. aggregated financial asset price evolution, several hundreds or more non-trivial processes can act concurrently. In such situations these traditional methods do not allow one to predict, nor characterize, the key processes, and hence understanding in these fields generally advances at a slower pace.

Machine learning is a tool which in principle offers the opportunity to characterise such dynamical statistical systems. However, in practice the performance of machine learning systems on any particular data set is limited by the problem of hyperparameter optimization. While various techniques for optimising hyperparameters are known, this issue very often this creates delay and/or difficulty in achieving desired performance of machine learning technology. In addition, it is very often the case that access to data is a rate-limiting factor in machine learning performance.

SUMMARY

According to the present invention, there is provided a method of performing machine learning on a data set representing a dynamical statistical system of entities having plural primary variables that vary with time, the entities comprising one or more species, the method treating the primary variables as dimensions in an effective configuration space, and treating secondary variables that are dependent on the rate of change of each of the primary variables as variables in an effective momentum space, and treating the effective configuration space and the effective momentum space together as a phase space, the method comprising, in respect of the or each species of entities:

deriving a distribution function over time of the density of entities in the phase space;

encoding the distribution function as a sum of contour functions over time describing the contour in phase space of plural phaseons which are entities of a model that are localised in the phase space; and performing machine learning on the encoded distribution function and/or at least one field in the effective configuration space derived from the encoded distribution function, in respect of the or each species of entities.

The present invention provides a non-linear improvement in machine learning technology for characterising complex dynamical statistical systems, enabling robust and systematic identification, categorization, and compression of significant processes involved in those dynamical statistical systems. The improvement is in part based on use of a single, unified efficient representation of data sets of many different types and formats.

The method involves treating the primary variables as dimensions in an effective configuration space, and treating secondary variables that are dependent on the rate of change of each of the primary variables as variables, so that the effective configuration space and the effective momentum space together form a phase space within which the primary variables and the secondary variables lie. In some cases, for example where the entities are physical particles, then the effective configuration space may be a real space, that is three-dimensional Euclidean space or a lower order representation thereof, and the effective momentum space is a space of the secondary variables. In other cases, for example where the entities are non-physical, then the effective configuration space and the effective momentum space are abstract spaces which is analogous to the spaces in the case of entities that are physical particles.

A distribution function over time of the density of entities in the phase space is derived and used to encode the data set into a representation of "phaseons", where the phaseons are entities of a model of the dynamical statistical system that are localised in the phase space. Each phaseon is described by a contour function over time that describes the contour in phase space of the phaseon. Thus, the distribution function is encoded as a sum of contour functions over time describing the contour in phase space of plural phaseons. Thus, phaseons are fundamental entities of the model which have no sub-structure on the relevant scale used by the model.

Phaseons thusly defined can form an efficient unified representation of multiple different dynamical statistical systems. Therefore the problem of hyperparameter optimization of machine learning systems is reduced in difficulty by virtue of having to address the problem in a smaller multiplicity of circumstances and data formats. This generality of use vastly furthermore increases the types of data set which can be efficiently processed, thereby providing substantially improved performance of the machine learning technology in providing system characterization.

Further according to the present invention, there is provided: a computer program computer program capable of execution by a computer apparatus and configured, on execution, to cause the computer apparatus to perform a similar method; a computer-readable storage medium storing such a computer program; or a computer apparatus arranged to perform a similar method.

BRIEF DESCRIPTION OF DRAWINGS

To allow better understanding, embodiments of the present invention will now be described by way of non-limitative example with reference to the accompanying drawings, in which.

DETAILED DESCRIPTION OF EXEMPLARY EMBODIMENTS

Figure 1:
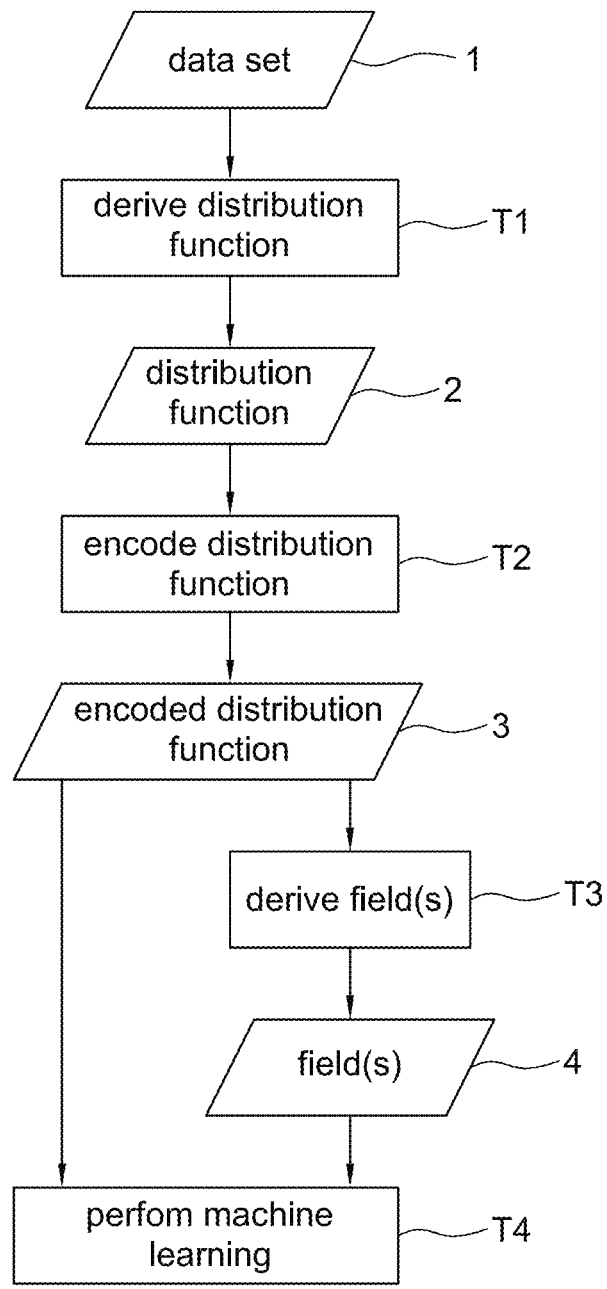
FIG. 1 is flow chart of a method of characterising a dynamical statistical system of entities.

A method of performing machine learning on a data set 1 representing a dynamical statistical system is shown in FIG. 1

All the methods disclosed herein are implemented in a computer apparatus. To achieve this, a computer program capable of execution by the computer apparatus may be provided. The computer program is configured so that, on execution, it causes the computer apparatus to perform the method.

The computer apparatus, where used, may be any type of computer system but is typically of conventional construction. The computer program may be written in any suitable programming language. The computer program may be stored on a computer-readable storage medium, which may be of any type, for example: a recording medium which is insertable into a drive of the computing system and which may store information magnetically, optically or opto-magnetically; a fixed recording medium of the computer system such as a hard drive; or a computer memory.

The method shown in FIG. 1 is performed as follows.

The method processes a data set 1 representing a dynamical statistical system of entities having plural primary variables that vary with time. The dynamical statistical system, including the entities and the variables, may be of many different types. The representation of the properties by the primary variables (and also the secondary variables discussed below) may be in any manner. For example, the properties may be represented directly by canonical quantities or by quantities that are scaled or normalized.

Generally, the dynamical statistical system is defined to be a collection or ensemble of a large number of entities which may be physical entities or non-physical entities. The entities have variables, that are properties that exhibit a time dependency. The variables typically couple weakly to external forces. This is an extremely general description of many kinds of system, including physical systems such as systems of particles, human-created systems such as financial markets, and other phenomena. Boundaries of the system of interest can very often be defined in such a way that external forces play a negligible role.

The dynamical statistical system can be in equilibrium, e.g. as in conveying a Maxwellian distribution for thermalized physical system, or can be in non-equilibrium.

Example dynamical statistical systems to which the method may be applied include, non-exhaustively, plasma electrons, non-relativistic ions, air molecule fluid, heat fluid flow of power plant, financial securities data, multi-variate high-fidelity sensor data obtained from airplane engine measurements, relativistic electron currents involved in space weather, planetary motion in the solar system, and financial markets, e.g. baskets of financial securities evolving in a stock market. Weakly correlated classical systems are discussed below, but other systems including but not limited to quantum and highly correlated systems, are also covered by the present invention.

One type of dynamical statistical system to which the method may be applied is a dynamical physical system in which the entities may be particles, typically being a micro-scale or nano-scale physical system. The physical system may be one studied in basic research or in applications that depend thereupon. The dynamical physical system is a mathematical formalization which describes the time dependence of the position of a particle in phase space.

Herein, the term "particle" is used in its normal sense to mean a minute, localised element of matter. Typically, the particle will have an average diameter of 100 μm or less, more typically 10 μm or less. Thus, the particles may have an average diameter on a micro-scale (of the order of 0.1 μm to 100 μm), but in many physical systems, the particles are significantly smaller and may have an average diameter on a nano-scale (of the order of 0.1 nm to 100 nm) or in principle even smaller.

The particles may be any type of particles, depending on the nature of the physical system. Examples of particles include, without limitation, groups of molecules, individual molecules, atoms, ions or sub-atomic particles (for example electrons), or any combination thereof. For example in the case that the physical system is a plasma, the particles may comprise electrons and ions. Alternatively, the particles may be fluid elements of a fluid. In the case that the fluid is a liquid, the particles are not separate but are elements of a continuous liquid (although they may correspond to a collection of molecules of the liquid).

Some non-limitative examples of physical systems which may be studied are:

High energy density plasmas

Laser-driven plasmas

Fusion plasmas, for example Inertial Confinement Fusion plasmas or Magnetic Confinement Fusion plasmas, for example of the type disclosed in Bishop, C. M. (1994). Review of Scientific Instruments, 65(6), 1803-1831, doi:10.1063/1.1144830

Low temperature plasmas

Micro-physics of astrophysically-relevant plasma processes, e.g., collisionless shock waves and their acceleration of particles Plasma states comprised of electrons and singly-charged or multiply-charged ions Plasma states comprised of electrons and positrons Dusty plasmas Atomistic dynamics Molecular interactions Warm dense matter interactions Plasma applications, for example of the type disclosed in Chen, (1995), Industrial applications of low temperature plasma physics. Phys. Plasmas, 2 (June), 2164-2175, doi:10.1063/1.871477

Figure 2:
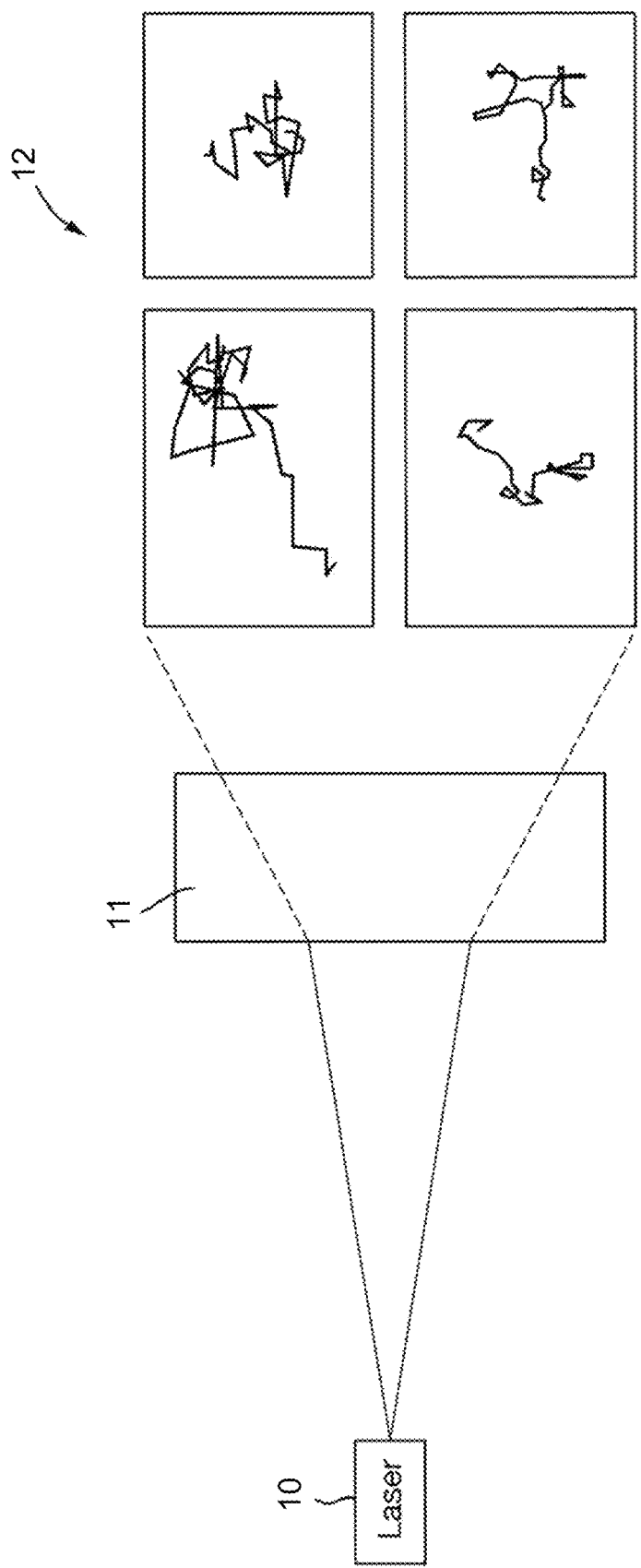
FIG. 2 is a schematic diagram of a dynamical physical system that is a plasma of a metal driven by a laser, as well as example trajectories of particles represented by the input data.

FIG. 2 shows an illustrative example where the physical system is a plasma of a metal driven by a high-power laser, for example petawatt-scale ($10^{15}$ Watt) laser. In particular, FIG. 2 shows the laser 10 that illuminates a metal target 11. Particles of the metal that interact with the laser carry out the material response to the laser driving force. In this situation, the laser is the non-equilibrium driving force and the metal, which is rapidly field-ionized into a micro-scale hot dense plasma comprising electrons and ions, is the dynamical physical system. The relevant dynamical processes in this physical system, governing how the metal responds to the laser, are therefore associated with the laser acceleration of the electron and ion particles.

In the case of a dynamical physical system in which the entities may be particles, the primary variables that vary with time are the positions of the particles in space.

However the method may be applied to dynamical statistical systems other than dynamical physical system in which the entities may be particles.

Another type of dynamical statistical system to which the method may be applied is a physical system where the entities are not particles and the variables represent the values of any physical property relevant to the system. In one example where the dynamical physical system is a power plant or other industrial installation, the entities may be components of the industrial installation and the primary variables may be temperature, or other process-related properties. In another example where the dynamical physical system is an airplane engine, the primary variables may be measurements taken by multi-variate sensors. In another example where the dynamical physical system is space weather, the primary variables may be relativistic electron currents.

Another type of dynamical statistical system to which the method may be applied is a non-physical system. By way of example, such a non-physical dynamical statistical system is an economic system or a financial market. In that case, the entities may be any combination of entities that make up the economic system or a financial market. For example, in the case an economic system, the entities may be any combination of entities such as individuals, companies, and/or other organisations. Similarly in the case of a financial market, the entities may be any combination of stocks and/or financial products.

The data set 1 may come from any suitable source. Where the dynamical statistical system is a physical system, the data set 1 can be derived from physical measurements of a dynamical physical system, or derived from the output of a numerical simulation of the dynamical physical system. More generally, the data set 1 can come from any other sources, e.g. a computer simulation, financial records where the dynamical statistical system is a financial market, and so forth.

The entities may be of plural different species. For example, in a dynamical physical system in which the entities are particles, the species may be different types of particles, for example ions and electrons. Similarly, in a dynamical statistical system that is a financial market, the species may be different types of financial products, for example stocks, derivatives, etc.

Some examples for the data set 1 are now given in the non-limitative example that of a dynamical physical system in which the entities may be particles. In this example, the data set 1 may be derived in different ways, for example as follows.

The data set 1 may be derived from physical measurements of an actual dynamical physical system. For example, the phase space state over time may be recovered from a suitable high quality high repetition rate experimental apparatus, or from the output of relevant industrial processes. Such experimental input to the method can be acquired using a variety of sensors and techniques. By way of non-limitative example, this may include any of the following:

Particle energy spectra

Spectra of radiation emitted by particles

Absorption of the energy of the driver, that is of the non-equilibrium force applied to the system Streaked optical imaging X-ray imaging Fusion product, e.g., neutron, yields Charged-particle probing Alternatively, the data set 1 may be derived from the output of a numerical simulation. It may include a subset of the data output by the numerical simulation.

Numerical simulations form a modern approach to carrying out scientific inquiry using supercomputers. These simulations utilize and solve equations representing relevant laws of nature, for example Maxwell's equations and the Lorentz force equation. Typically such numerical simulations have been extensively tested for accuracy, debugged, benchmarked, and confirmed to agree with experimental reality. Their output has been widely accepted in the scientific community to correspond to reality and have been established as a fundamental pillar of modern physics. Such computational physics is thus not abstract, and is widely afforded comparable importance to experimental physics and to theoretical physics.

By way of illustration, one possible type of numerical simulation that may be used is a particle-in-cell (PIC) numerical simulation. A PIC numerical simulation refers to a technique used to solve a certain class of partial differential equations. In this method, individual particles in a Lagrangian frame are tracked in continuous phase space, whereas moments of the distribution such as densities and currents are computed simultaneously on Eulerian (stationary) mesh points. Software representing a PIC numerical simulation may be referred to as a PIC code. At their core, PIC codes are designed to predict the time history of a system comprised of many charged particles. PIC codes solve this problem very generally, making few assumptions about the properties of the charged particles in the system. This generality implies the value of PIC codes as well as their computational expense. PIC codes may implement the Maxwell-Vlasov system of equations describing this general approach. Maxwell's equations cover the fields, currents, and so on that are associated with the moving charged particles comprising the system. The Vlasov equation describes the evolution of these particles in six dimensional phase space, i.e., three spatial coordinates and three momentum coordinates, and in time. These codes are extensively used to inform upcoming experiments, guide theoretical developments, and generally to advance the scientific enterprise.

In situations where the available data is limited by some external factor and so is a sparse representation of the dynamical physical system, then the data set 1 may be derived using a compressive sensing technique. Compressive sensing is a statistical signal processing technique that enables a distribution to be efficiently recovered from sparse data by finding solutions to underdetermined linear systems. Compressive sensing provides efficient acquisition and reconstruction of a signal. By way of example, such compressive sensing may be performed as disclosed in Candes, Romberg & Tao, (2006), IEEE Transactions on Information Theory, 52(2), 489-509, doi:10.1109/TIT.2005.862083 or as disclosed in Candes & Tao, (2006), IEEE Transactions on Information Theory, 52(12), 5406-5425, doi:10.1109/TIT.2006.885507.

Compressive sensing may be applied however the data set 1 is derived. It may commonly be applied where the data set 1 is derived from physical measurements, in which case it is typically impractical to obtain a full series of measurements of every particle in the dynamical physical system of interest. However, compressive sensing may also be applied where the data set 1 is derived from the output of a numerical simulation. Some numerical simulations may provide a complete representation, but others may be sparse so that compressive sensing is applicable.

The method treats the primary variables as dimensions in an effective configuration space. Thus the variables represent the state of the system in the effective configuration space at any given time. The state is a point in the phase space of the dynamical system, being a space in which all possible states of a system are represented. The space of a system in this sense is a multi-dimensional space in which every degree of freedom or parameter of the system is represented as a dimension of the space.

In some cases, for example where the entities are physical particles, then the effective configuration space may be a real space, that is three-dimensional Euclidean space or a lower order representation thereof. In that case, the state represented by the primary variables of the data set 1 may be positions of the entities in the real space. The position may be represented by generalized coordinates in a vector space defined by these coordinates called the configuration space which is part of the phase space of the physical system. Such generalised co-ordinates may represent positions in any manner. They may represent the positions as a three-dimensional vector, for example a vector $r=(x, y, z)$ where x, y and z are the positions in three dimensions, or may represent position in a space of lower dimensionality.

The method also uses secondary variables that are dependent on the rate of change of each of the primary variables. The secondary variables may be part of the data set 1, together with the primary variables, that is input to the method. Alternatively where the data set 1 input to the method comprises only primary variables, the secondary variables may be derived from the primary variables as part of step S1.

Various different secondary variables that are dependent on the rate of change of each of the primary variables may be used. In the case that the primary variables represent positions in real space, the secondary variables may represent a velocity or momentum. In the case that the fundamental variables represent positions in an effective configuration space that is not a real space, the secondary variables may analogously represent a velocity or momentum in that effective configuration space.

The secondary variables may be scaled by a constant referred to as a "mass", which may differ for different species of entity. In the case that the primary variables represent particles, then the "mass" may be an actual mass of the entity, so that the secondary variables represent the momentum of the particles. In other cases, the "mass" may be an analogous property of the entities, so that the secondary variables are analogous to momentum in the effective configuration space. For example, if the variables represent temperature of entities, then the "mass" may be a thermal constant of the entity, and so on. The generalized "mass" (also termed "effective mass") can be useful to facilitate modelling of general multi-scale behaviours of statistical systems, e.g., ions and electrons in plasma or stocks of different sectors in financial markets. However, use of the "mass" is not essential. More generally, and notwithstanding the use of the term "momentum space" below, the "mass" may be set to unity, especially in the case that there is a single entity.

The secondary variables may be proportional to a derivative over time of the positions in the configuration space, for example being a velocity or momentum in effective configuration space. Alternatively, the secondary variables be dependent on the rate of change of the primary variables in other manners, for example representing a Lorentz factor, optionally a signed Lorentz factor (which may be implemented using a factor γi discussed further below), or kinetic energy of the entities in each dimension in effective configuration space.

In the method, the secondary variables are treated as variables in an effective momentum space. Furthermore, the effective configuration space and the effective momentum space together are treated as a phase space. In the case where the entities are physical particles and the configuration space is a real space, then the momentum space and the phase space are conventional. In the case where the entities are not physical spaces, then the momentum space and the phase space are abstract spaces which is analogous to the spaces in the case of entities that are physical particles. The term "effective momentum space" is used by analogy to common usage for dynamical physical systems, but covers the case that all "masses" have a common value or are set to unity such that the secondary variables represent velocity, or another variable dependent on the rate of change of the primary parameters in the effective configuration space, rather than momentum.

Thus, the data set 1 represents the phase space state over time, starting from a particular initial condition and evolving over time. That evolution may be considered as a phase space trajectory of the system through the high-dimensional space. The period of time may be any suitable period for the dynamical statistical system under study. The data set 1 may represent the dynamical statistical system over a single interval in time. However, additional power may be provided by the data set 1 representing the dynamical statistical system over successive intervals in time. In this case, the method may be performed on the data set 1 in respect of each interval of time. The data set 1 may be any partial or complete representation of the phase space distribution of the entities.

For clarity, it is noted that elsewhere the term "phase space" is sometimes used in a manner in which in context means the "phase space state" as used herein. For example, elsewhere the phrase "phase space of a system" may in context be used to refer to the state of the system in its phase space.

By way of example of the case that the entities are physical particles, FIG. 2 shows representations 12 of four different sample trajectories in space of the particles, in this example being electrons. This is a small subset of the many hundreds typically present, involved in the material response. Each trajectory is represented by the time-series of positions of the particle, where time is labelled appropriately. Although not visible in FIG. 2 due to being a black-and-white drawing, the time (corresponding to different points along the trajectory) can be denoted by different shadings or colours in a displayed representation. In this example, the data set 1 represents the phase space of all the particles that respond to the laser. Further information about this illustrative example is given below by way of example, although the scope of the invention is not restricted to this case.

Figure 3:
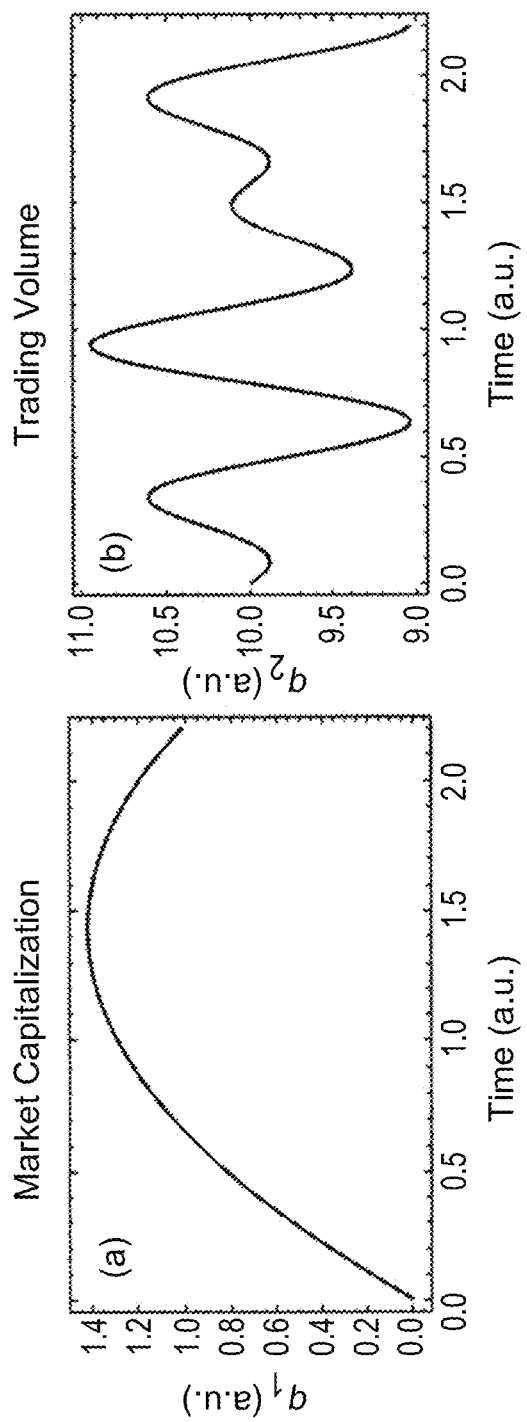
FIG. 3 is graphs of two primary variables of an entity in an example of a non-physical dynamical statistical system.

By way of example of the case that the entities are non-physical entities, FIG. 3 shows sample non-physical data of the data set 1. In this example, the entity is a company, being one of many in the data set 1, and the variables are (a) market capitalization and (b) trading volume associated with the company over a period of time represented using arbitrary units (a.u.). In this example, all companies are represented using a single species. The vertical axes representing the magnitude of (a) market capitalization in and (b) trading volume comprise two generalized configuration space coordinates $q_1$ and $q_2$ respectively.

Figure 4:
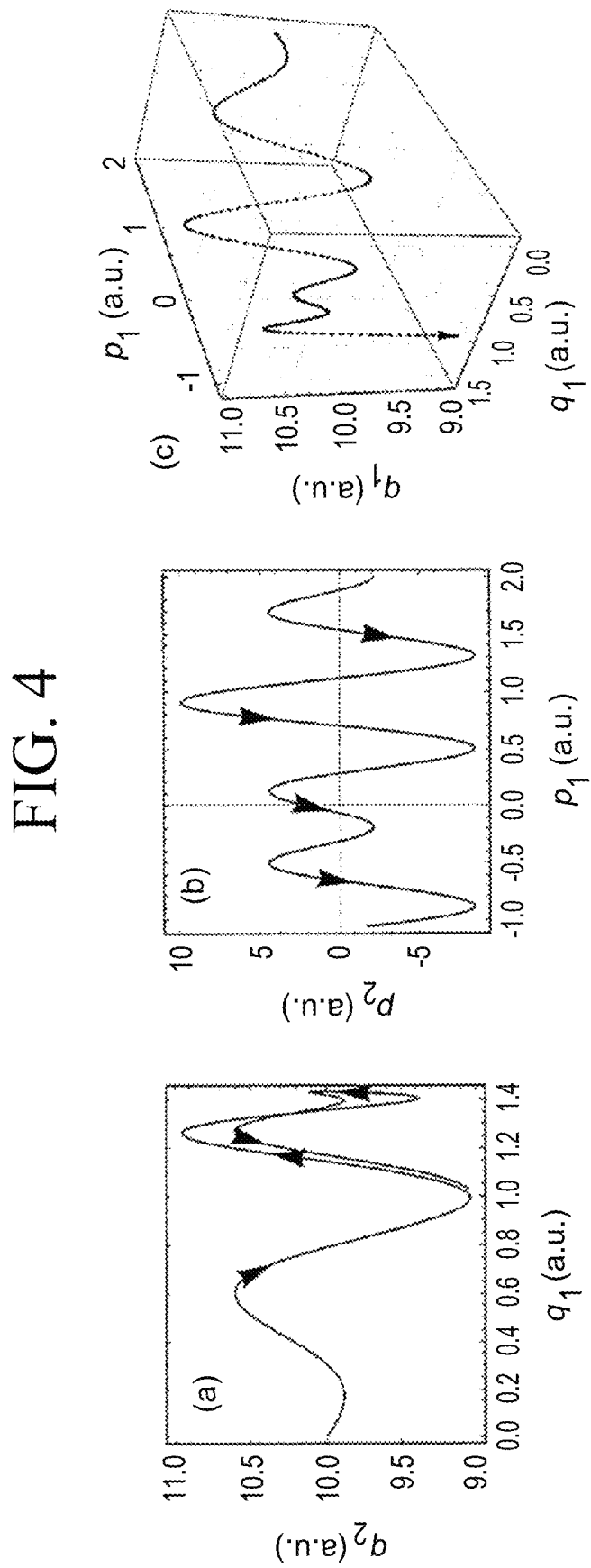
FIG. 4 is a set of graphs illustrating the relationships between primary and secondary variables in the example of FIG. 3.

FIG. 4 illustrates the development of unified encoding of the non-physical dynamical statistical system data of FIG. 3. In particular, FIG. 4 shows key aspects of construction of the effective two degree-of-freedom distribution function $S(q_1, q_2, p_1, p_2, t)$ associated with the financial market inputs described in FIG. 3. The arrows along the curves shown in each plot indicate the direction of time. FIG. 3(a) shows the generalized configuration space subset of a distribution function and FIG. 3(b) shows that of the generalized momentum space. FIG. 3(c) depicts the $q_1$, $q_2$, and $p_1$ components of the distribution function, exhibiting the evolution of portions of the phase space density of the system.

Steps T1 to T3 of the method shown in FIG. 1 will now be described. Steps T1 to T3 may be performed in respect of each species of entity in the dynamical statistical system, if there is more than one such entity In step T1, a distribution function 2 over time of the density of the entities in the phase space is derived. The distribution function 2 may form a partial or complete representation of the system. This step may be performed as follows.

The distribution function 2 may be a statistical distribution function $S^N$ that quantifies the scalar field exhibiting the probability that a dynamical statistical system comprised of a mixture of N species of entity takes a specific configuration in 2M×N dimensional phase space at a given time. M corresponds to the number of degrees of freedom in the configuration space, and therefore also the momentum space, required to describe the system of interest, and may for example have a value of three where the configuration space is real space.

$S^N$ for dynamical statistical systems is constructed by generalizing physical attributes such as configuration space (i.e., real space) to an "effective" (also termed "generalized") space which need not be physical in nature.

qi representing the primary variables for the i-th element may be constructed as the generalized configuration space vector having M dimensions, which can be indexed by $q_{i,1}$, $q_{i,2} \ldots q_{i,M}$. In this document bold formatting is used widely in order to indicate a vector quantity.

The generalized momentum space vector $p_i$ having M dimensions representing the secondary variables for the i-th element is constructed by computation from $q_i$ according to how the secondary variables depend on the rate of change of the primary variables. For example, where the secondary variables represent momentum in the configuration space, they may be calculated through $dq_i/dt = p_i/(m_i \gamma_i)$ where t is the time coordinate and the generalized mass is $m_i$. $\gamma_i$ may take a value of 1 where a non-relativistic model is applied. Alternatively, where a relativistic model is applied so the secondary variables represent the generalized Lorentz factor in the configuration space, they may be calculated through $\gamma_i = [1+[p_i^* p_i/(m_i^2 c^2)]^{1/2}]$ with c representing the speed-of-light. $p_i$ can be indexed by $p_{i,1}, p_{i,2} \ldots p_{i,M}$.

A distribution function 2 is then constructed for each species satisfying $S_i \in S^N$ where $S_i = S_i(q_i, p_i, t)$ is a Lorentz-invariant scalar field which describes the phase space density of entities of species i. As an example, in a dynamical statistical system of a plasma containing electrons and ions. i=1 might correspond to electrons, therefore the distribution function 2 associated with electrons is $S_1$, and ions might have i=2, therefore the distribution of $S_2$.

In step T2, the distribution function 2 derived in step T1 is encoded as a sum of contour functions over time describing the contour in phase space of plural "phaseons" to provide an encoded distribution function 3. Such phaseons are entities of a model of the dynamical statistical system that are localised in the phase space. Thus, the distribution function 2 is sampled by a total of L phaseons which may be considered to be fundamental entities of the model in phase space which lack substructure on the scale relevant to the properties being considered.

In a technical sense, a phaseon is a quantum of phase space density. The term is coined herein to represent a modelled "particle" in the generalised phase space, but has been derived by analogy from the terms "proton", "photon" and "electron" which are examples of particles in a phase space and would therefore be pronounced "phase-on".

Thus, the sum of the contour functions for the phaseons accurately reproduces the distribution function 2 according to:

$$S_i(q_i, p_i, t) = \sum_{l=1}^{L} \lambda_l \alpha(q_i - q_{i,1}(t), p_i - p_{i,1}(t))$$

where $\lambda_l$ is a normalization or weight coefficient and $\alpha$ is the contour function describing the form of the phaseon; $q_{i,1}(t)$ is the position of the phaseon's centroid in generalized configuration space at time t; and $p_{i,1}(t)$ is the position of the phaseon's centroid in generalized momentum space at time t.

The contour function $\alpha$ localises the phaseon in phase space and may in general take any form. Examples of the contour function include, but are not limited to, a delta function, a normal distribution centered at $(q_{i,1}(t), p_{i,1}(t))$ or Heaviside function. The contour function $\alpha$ may be parametric or non-parametric.

In specific physical systems, e.g. a kinetic plasma, phaseons exhibit similarities to particles in representing the distribution function 2. However, phaseons are a more fundamental representation. Generally, in a physical system a smaller number of phasesons can represent a system comprised of a larger number of physical particles, as is described by this method. Thus, typically the number of phaseons is less than the number of entities of the dynamical statistical system. However, as the phaseon is localised in configuration space, it is directly correlated with entities contributing to the distribution function 2 at the location of the phaseon.

Phaseons are used to sample $S_i$ to the resolution specified by the user at all times in the dynamical evolution of the system.

Numerical procedures of implementing this sampling process include, but are not limited to, initializing a model of the dynamical statistical system using a uniform mesh with a specified number of phaseons in each mesh element. The next step involves iteratively modifying the number of phaseons in each element in proportion to the normalized phase space density in that mesh element. This process can either be carried out in a continuum or discretized manner, with the number of phaseons in the former approach being set by a thresholding or quantization process.

A fixed number L of phaseons may be used to model the system through its evolution. Alternatively phaseons can be dynamically added or subtracted from the system.

In the case of the data set 1 input to the present method being Eulerian or Lagrangian "moment" (also termed "fluid") data input, a number of potentially non-unique phaseon representations can be constructed such that the input data is accurately reproduced to the user's specification through its evolution.

This representation can be obtained, for example, by computing the phaseon distribution needed to reproduce the data set 1 as given through integration over the distribution function 2, through time, while this reproduces the input data within the margin of accuracy specified by the user.

The phaseon distribution which encodes the dynamical statistical system can be normalized against quantities including but not limited to the integral of $S_i$ over all $q_i$ and $p_i$.

Other processes of normalization and "preprocessing" of data, include but are not limited to:
1. Selection of a constant function or value of $\lambda_i$ for a system.
2. Specification of maximal dimensionality in $q_i$ and/or in $p_i$ and padding dimensions in excess of that required for a single system with values, e.g., zeros.
3. Specification of maximal value of the domain and/or range in $q_i$ and/or in $p_i$ and padding dimensions in excess of that required for a single system with values, e.g., zeros.
4. Calculation of the difference and/or derivative of values of $q_i$ and/or in $p_i$ for use in the methods with the appropriate value normalization.

Figure 5:
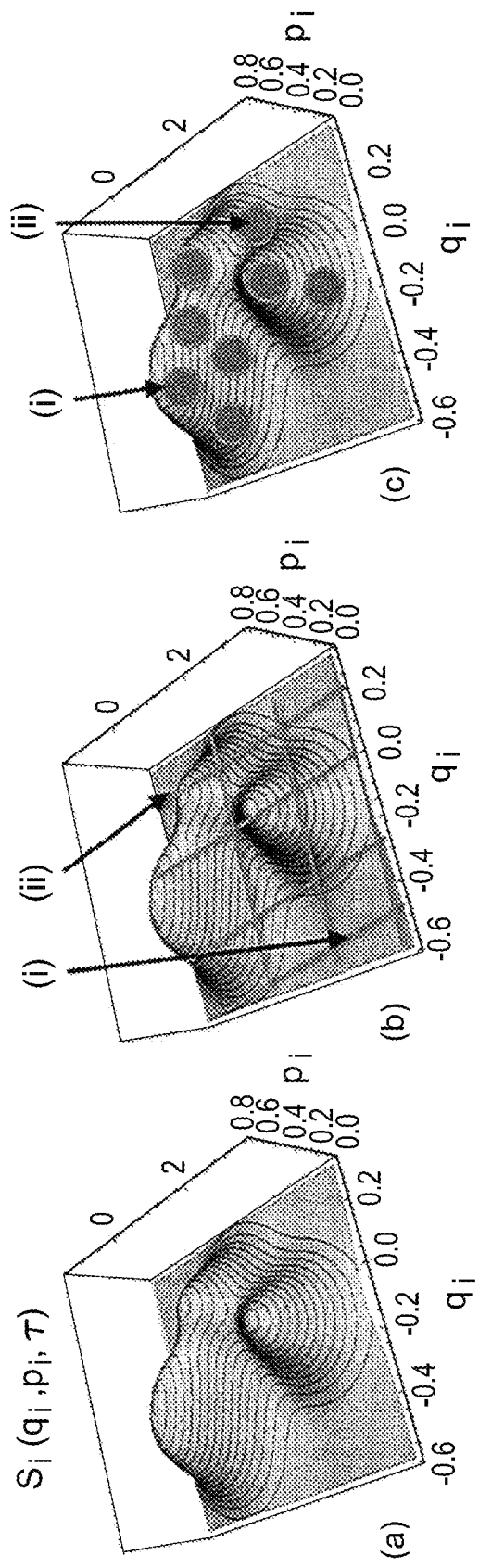
FIG. 5 is a set of perspective graphs in phase space illustrating development of a unified encoding of a dynamical statistical system.

These normalization processes facilitate data preprocessing which is unified in the respect that the phaseon representation can encode almost all dynamical statistical systems. Therefore the problem of hyperparameter optimization of machine learning systems, which is very often the most substantial difficulty involved in achieving desired performance of machine learning approaches, is reduced in difficulty by virtue of have to address the problem in a smaller multiplicity of circumstances and data formats. The evolution of the system is then described to the degree of accuracy specified by the user by the evolution of the centroids of the phaseons By way of illustration, FIG. 5 illustrates the development of a unified efficient encoding of dynamical statistical system data over two dimensions (for ease of visualisation, noting that the dimensionality is typically higher). FIG. 5(a) shows a "snapshot" at time τ of a sample distribution function 2 associated with species i which can represent physical or non-physical systems. FIG. 5(b) shows a uniform-grid numerical encoding of the distribution function 2 which underscores the inefficiency associated with oversampling of regions of low phase space density indicated using (i) and (ii). FIG. 5 (c) shows an efficient encoding of the distribution function 2 using "phaseons," represented using blue spheres, as covered in the present invention. The functional form of the phaseon indicated by (i) is $\alpha(q_i-q_{i,1}, p_i-p_{i,1})$ and that of the phaseon indicated by (ii) is $\alpha(q_i-q_{i,2}, p_i-p_{i,2})$.

The form of the contour function $\alpha$ may be predefined. Alternatively, the form of the contour function $\alpha$ may be derived using a numerical methods.

A possible numerical method for deriving contour function $\alpha$ is as follows.

A set of possible contour functions is defined, for example including without limitation: delta function, Gaussian function, Heaviside function. These contour functions may be parametric or non-parametric.

Iteration through each possible contour function is performed, as well as its parameters as applicable, and in each iteration encoding the distribution function 2 using phaseons of this kind. The encoded distribution function s are indexed as $S_{i, encoded, a}$, where a=1, 2 . . . , A for A total encodings. Thus $S_{i, encoded, a}$ corresponds to the distribution function 2 encoded with phaseons using the specified function for $\alpha$ in the a-th iteration.

An optimization function is defined which can represent, non-exhaustively, the error in the encoding of the distribution function 2 relative to the distribution function 2 itself: $E_a=<|S_{i,encoded,a}-S_i|>$, where | . . . | corresponds to absolute value operator and < . . . > to the averaging operator.

One of the possible contour functions is selected as the function which corresponds to Min($E_a$), where Min( . . . ) represents the minimization operator, i.e., $\alpha$ is the function which minimizes error in the encoded distribution function 3.

In step T3, which is optional, there is derived at least one field 4 in the effective configuration space representing a quantity derived from the encoded distribution function 3 derived in step T2. Such fields 4 provide additional information about the properties of the dynamical statistical system that facilitate machine learning. The fields 4 may be considered as representing "macro" properties of the system, by contrast to the phaseons which provide a "micro" picture of the dynamics of the underlying system.

Some examples of fields 4 which may be derived as follows.

In one example, a derived field 4 may be a moment field in the effective configuration space representing a quantity in a Eulerian or Lagrangian representation that is derived by integration of the encoded distribution function 3 over the effective momentum space. The phaseon representation of the distribution function 2 is an optimally general representation of the data as both Eulerian and Lagrangian representations are non-unique, i.e. a given Eulerian or Lagrangian field can be constructed by, in general, a non-singular configuration of phaseons.

The Eulerian representation can facilitate capture of additional high-level features of the data and the Lagrangian representation can facilitate the evaluation of localized aspects (e.g. in generalized configuration space or time) of the data, thus substantially improving performance of system characterization.

Multiple Eulerian and Lagrangian fields can be constructed using the encoded distribution function 3 which correspond to integrals over Si. The fields 4 can be scalar fields, vector fields, or tensor fields.

Some non-limitative examples of a field 4 which is a moment field in a Eulerian representation and their derivation are as follows.

A moment field in a Eulerian representation which may be used is a field of the Eulerian quantity termed the "zeroth moment", corresponding to the effective density, which may is calculated by:

$$M_0 = \int_{-\infty}^{\infty} S_i(q_i, p_i, t) dp_i$$

where the integral is carried out over all generalized momentum coordinates to produce a scalar field in generalized configuration space at each point in time.

Another field in a Eulerian representation which may be used is a field of the Eulerian quantity termed the "first moment" corresponding to the effective momentum field, which may be calculated by:

$$M_1 = \frac{1}{M_0} \int_{-\infty}^{\infty} p_i S_i(q_i, p_i, t) dp_i$$

where the integral is carried out over all generalized momentum coordinates to produce a vector field in generalized configuration space at each point in time.

Numerical methods to progress derivation of the Eulerian representation of phaseon data include, but are not limited to:
i. Initializing an Eulerian (i.e., static) mesh of points in qi space with a resolution consistent with the degree of accuracy specified by the user.
ii. Calculating integrals over Si corresponding to the "moment" of the encoded distribution function 3 according to (a-b).
iii. Interpolating the Eulerian values onto the mesh using a suitable numerical routine.

A field in a Lagrangian macro representation may be calculated according the standard convective derivative using the Eulerian macro representation as input. This is covered in many sources, e.g. Munson, Bruce R., Donald F. Young, and Theodore H. Okiishi. "Fundamentals of fluid mechanics." New York 3.4 (1990), pages 157-173 and 199-229.

Any one or more such moment fields may be derived.

In another example, a derived field 4 may be a forcing field in the effective configuration space representing a quantity which is dependent on the rate of change of the secondary variables. Such a forcing field may derived as well or instead of any moment fields.

Such a forcing field may be understood as follows. The change in the distribution function $S_i$ over time is governed by a kinetic evolution equation. For example, in Newtonian or relativistic classical systems the evolution equation may be given:

$$\partial S_i/\partial t + p_i/(m_i\gamma_i)\nabla_{qi}S_i + F_i/m_i\nabla_{pi}S_i = C_i$$

where $\nabla_{qi}$ is the gradient operator along $q_i$; $\nabla_{pi}$ is the gradient operator along $p_i$; $F_i$ represents the generalized (effective) forcing-field responsible for evolving phaseons in time; and $C_i$ is the effective collision operator. The effective collision operator Ci enables collisional or non-collisional statistical systems to be modelled, where collisionality involves localized entity interactions that can induce diffusion in the phase space of the system. For example, where the entities are particles, the effective collision operator Ci may model physical collisions. Alternatively, in systems where the particles do not undergo an interaction analogous to collision, the operator effective collision operator Ci may be omitted.

The analogous equation of evolution of the kinetic distribution function in plasma physics is described in many sources, e.g., Pukhov "Strong field interaction of laser radiation", Reports Prog. Phys. 66, 47-101 (2003).

In physical systems where the entities are not particles, and in non-physical systems, this forcing-field can be interpreted as analogous to a force acting on phaseons over time, which is informative in diverse statistical systems. It may contain latent information of the dynamical statistical system and improves the characterization of such systems by enabling the effective forces in a system, e.g. which describe the evolution of stocks, to be quantified.

In physical systems, the force law associated with a given system provides a compression and characterization of the behaviours associated with that system. For example, the well-known inverse square laws of Newtonian gravitation together with a very small set of quantities representing the initial conditions, e.g. vector coordinates representing the initial positions in space of all the planets in the solar system), can generate substantially more data corresponding to the planets' positions in space at all times in the future. It is thus clear that the force law together with a few vectors can be used to produce a very large set of vectors corresponding to the future positions of the planets in time, in effect providing a very large compression of solar system data.

The forcing field may be derived in various ways using either through inversion of the evolution equation set out above, accounting for any dependencies on the primary and/or secondary variables and/or time-rates of change thereof, or through a differential equation in accordance with Newton's second law of motion relating the force applied to phaseons to the time rate of change of the effective momentum of phaseons.

Numerical approaches to calculate deriving the forcing field $F_i$ include, but are not limited to:
i. Specification of the resolution of an Eulerian (i.e., static) mesh according the degree of accuracy set by the user of the method, and initializing the values of $F_i$ to zero at each point on this mesh.
ii. Calculating the force acting on each phaseon at every point in time by the time-rate of change of the phasesons generalized momentum.
iii. Interpolating the value of the forces described in (ii) onto the Eulerian mesh using a suitable numerical routine.
iv. Using the values in (iii) to initialize a machine learning approach to calculate the forcing-field at each point on the mesh, in parametric or non-parametric manners, such that all phaseon generalized momenta are evolved in time in a way that accurately reproduces the calculated time-dependent phaseon distribution.

In the same fashion as exemplified in the planetary motion case in (b), the values of $F_i$ in this manner, together with the initial phaseon positions in phase space, can be stored numerically. The initial positions of the phasesons is analogous to the initial positions of the planets, and $F_i$ is analogous to the inverse-square force of gravitation. It is therefore clear that this minimal information is all that is required to calculate all relevant properties the dynamical statistical system throughout all time. This forms an extreme compression of all types of dynamical statistical system data.

In practice, $F_i$ can be used iteratively, at each point in time, to evolve the phaseons as has already been described in point G (a-b).

A numerical code can readily be developed to implement this which operates in accordance with the methods described herein. Such a code can derive all relevant properties of the dynamical statistical system throughout its evolution, providing a novel kind of simulation tool, e.g. for evolution of stock market prices, as well as a method for compression of dynamical statistical system data.

Figure 6:
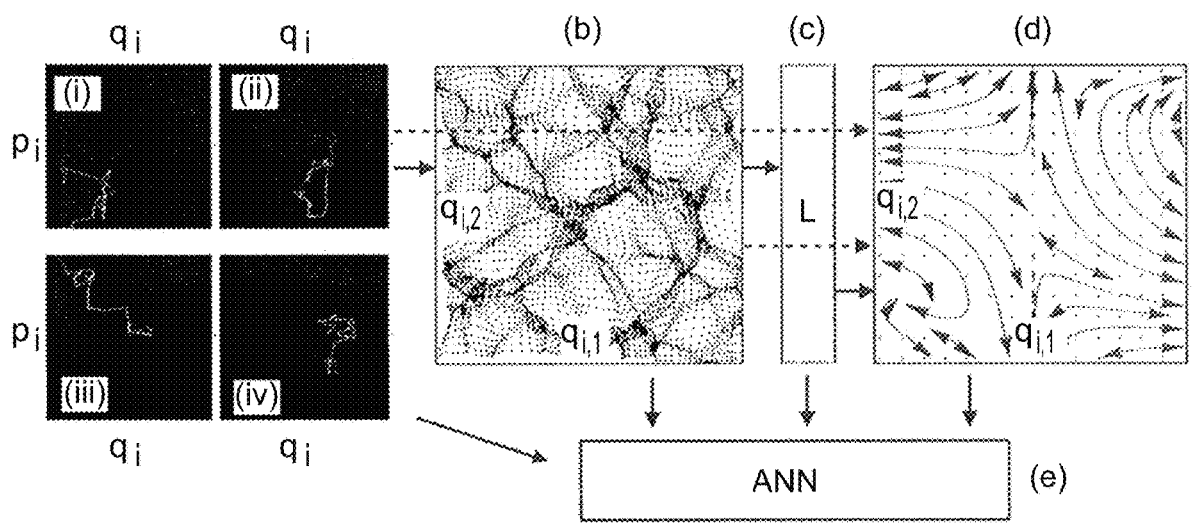
FIG. 6 is a schematic diagram illustrating construction of three different fields in the effective configuration space derived from the encoded distribution function.

By way of illustration, FIG. 6 illustrates the derivation of fields 4 that are dual moment fields in Lagrangian and Eulerian representations as well as the phaseon forcing-field associated with the encoded distribution function 3. FIG. 6(a) (i-iv) show the trajectories of four sample phaseons of species i, with colouring corresponding to time. FIG. 6(b) depicts the use of these phaseons to construct a sample two-dimensional Eulerian representation of the encoded distribution function 3. FIG. 6(c) shows the use of (a) and/or (b) to construct a Lagrangian representation of the system having the same dimensions in the generalized configuration space as (b). FIG. 6(d) depicts an example of the effective phaseon forcing-field which is constructed using singular or a combination of (a), (b), and (c). FIG. 6(e) shows the use of (a-d), singular or in any combination, input into an artificial neural network (ANN) as an example of a machine learning system for performing step T4 described below.

In step T4, machine learning is performed. The machine learning may be performed directly on the encoded distribution function 3 and/or may be performed on the at least one field 4 in the effective configuration space derived from the encoded distribution function 3 in step T3. Where there are plural series of entities, the machine learning may be performed in respect of each species of entities, taking the species individually or together.

In general step T4 may use a single machine learning architecture, or multiple architectures. The machine learning may be an artificial neural network (ANN). Other examples of suitable machine learning systems are given below. Where plural machine learning systems are used, the outputs may be combined together, or input into one or more additional machine learning system to further enhance characterization.

Figure 7:
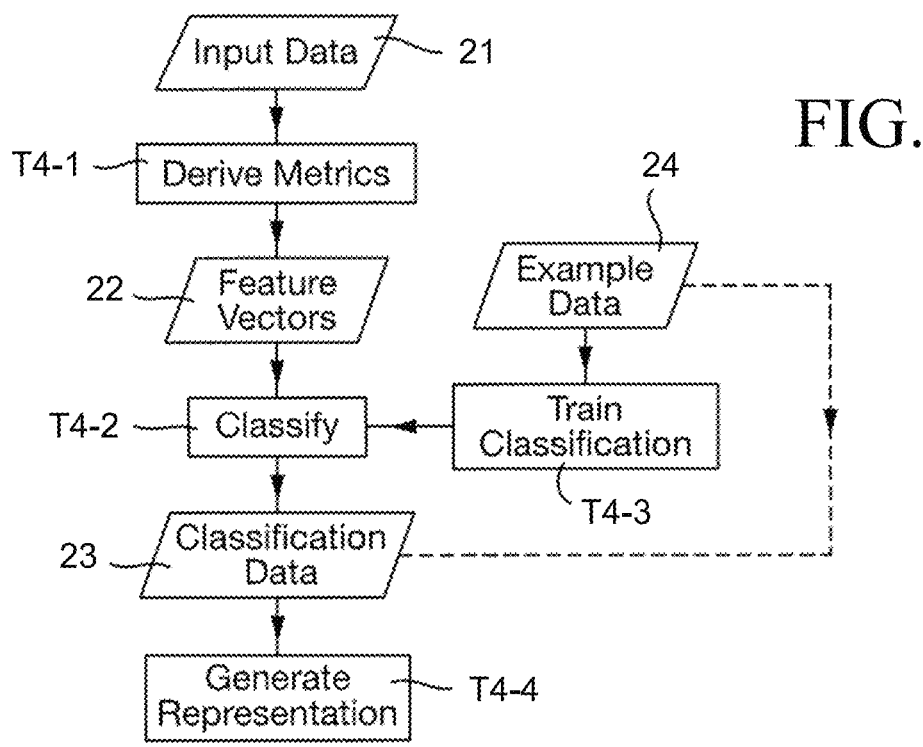
FIG. 7 is a flow chart of a supervised machine learning technique.
Figure 8:
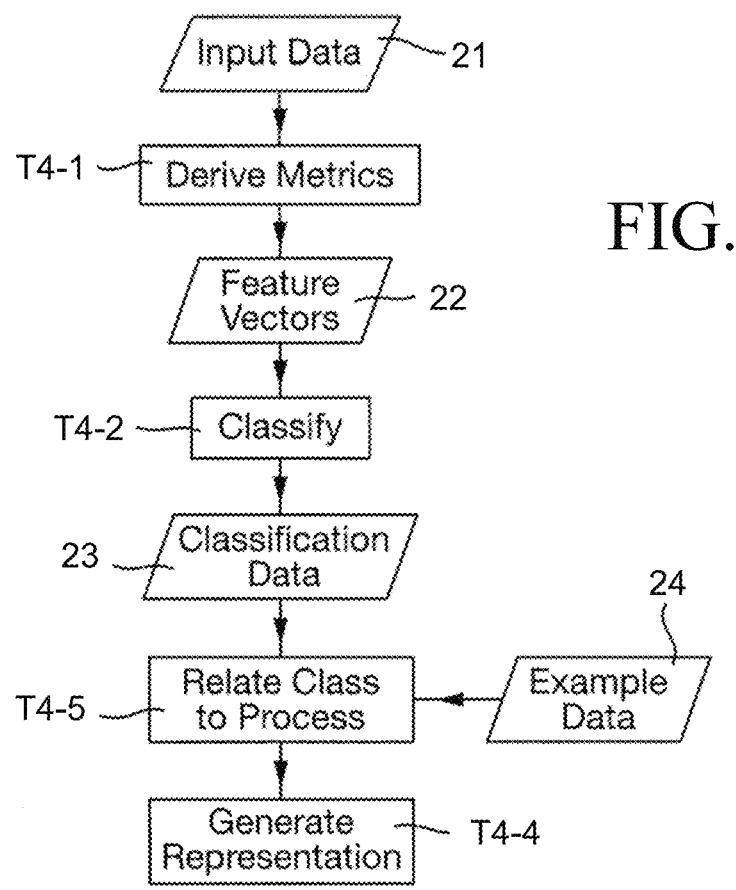
FIG. 8 is a flow chart of an unsupervised machine learning technique.

A method of performing step T4 using a supervised machine learning technique is shown in FIG. 7 and by way of comparison a method of performing step T4 using an unsupervised machine learning technique is shown in FIG. 8.

The method of performing step T4 shown in FIG. 7 is as follows.

The input data 21 to step T4 is the encoded distribution function 3 derived in step T2 and/or the at least one field 4 derived in step T3

In step T4-1, the input data 21 is processed by deriving a feature vector 22 in respect of each phaseon from the input data 21. The features vectors 2 each comprise plural metrics that feature vector in respect of each phaseon comprising plural metrics that are derived from the input data 21, i.e. from the encoded distribution function 3 and/or from the at least one field 4 in the effective configuration space. The feature vectors 22 therefore establishes a "fingerprint" of each dynamical process acting in the statistical system as a basis for subsequent classification using a machine learning technique.

The classes into which the phaseons are classified may correspond to different types of dynamical process acting in the dynamical physical system. In that case, the method provides characterisation of the dynamical processes acting in the dynamical physical system, which may provide more information than trying to investigate the dynamical processes per se.

Further power is given to the classification by the design of the feature vector on which the machine learning technique operates. In particular, feature vectors in respect of each phaseon are derived from input data representing the phase space state of the phaseons over time, and comprises plural metrics that each describe a change in the phase space state of the phaseon over time. Various different metrics may be used, as described in more detail below, but they may for example, be metrics that describe motion of the phaseon, metrics that describe the position and/or time of an event related to a change in energy of the phaseon metrics that are a representation of a trajectory of the phaseon, and/or values of the at least one field 4 in respect of the phaseon. The feature vectors comprising these metrics may be thought of as a unique "fingerprint" of dynamical processes acting in the physical system. This layer of complexity in the method allows a connection between the phaseon properties and dynamical processes to be established. The classification of the phaseons may be thought of as a global snapshot of relevant dynamical processes acting in the complex dynamical physical system.

A wide range of metrics derived from the encoded distribution function 3 and/or from the at least one field 4 in the effective configuration space may be selected.

The metrics may include metrics that are values of the at least one field 4 in respect of the phaseon The metrics may include metrics that describe a change in the phase space state of the phaseon over time. Such metrics desirably represent changes in the phase space state of the phaseons that are relevant to the dynamical physical system and its underlying dynamical processes. Some examples of suitable metrics that describe a change in the phase space state of the phaseon over time will now be described. These and other metrics may be used together in any combination.

The metrics may include one or more metrics that describe motion of the phaseon.

Examples of such metrics that describe motion of the phaseon may include any of the following:

a vector or magnitude of displacement from an initial position over time;

a vector or magnitude of velocity over time;

a vector or magnitude of rate of displacement from an initial position over time; or a vector or magnitude of Lorentz factor over time or position.

Another example of such a metric that describes motion of the phaseon is a metric that represents a distribution of path-lengths of straight-line displacements of the phaseon, for example being a frequency distribution. Other statistical representations of trajectories may alternatively be used.

Another example of such a metric that describes motion of the phaseon is a metric that represents the Lorentz factor of the phaseon over time.

Another example of such a metric that describes motion of the phaseon is a metric that comprises a three dimensional array, with array position corresponding to the configuration space of the phaseon and array value corresponding to the phaseon Lorentz factor The metrics may include one or more metrics that describe the position and/or time of an event related to a change in energy of the phaseon. Such an event related to a change in energy of the phaseon may be related to a discontinuous change in energy of the phaseon.

Such a metric that describes the position and/or time of an event related to a change in energy of the phaseon may be a vector or magnitude of displacement from initial position prior to a change in energy. The change in energy in this example may be a change in energy of a degree that is characteristic of a physical event of interest. For example, in the case of a physical system that is a plasma under the illumination of laser light the physical event of interest may be an acceleration to the ponderomotive potential energy of the laser light.

The metrics may include one or more metrics that is a representation of a trajectory of the phaseon. This type of metric has the advantage of allowing the metric to be subsequently be processed using known image processing techniques. Metrics that represent a trajectory may have any of the following features in any combination.

Such a trajectory may be represented by a series of positions of the phaseon. The series of positions of the phaseon correspond to different times.

Each position of the phaseon may be labelled with the corresponding time. The times may be represented by shades or colours in a representation of the trajectory that may be displayed.

Alternatively or additionally, each position of the phaseon may be labelled with one or more properties of phaseon, for example momentum, Lorentz factor (optionally a signed Lorentz factor) and/or energy. The quantities of that such a property may be represented by shades or colours.

Such a trajectory may be in any suitable space, for example in configuration space or in phase space.

Such a trajectory may represented be in three dimensions, or projected to lower dimensionality.

The computations used to derive the metrics from the input data can be performed in the programming language of the computer program used to implement the method. The resultant feature vectors 22 can be stored in a memory of the computer apparatus, for example a relational or other class of database, depending on the number of phaseons in the physical system and on performance and memory requirements.

For a metric of any type, the metric may comprise one or more scaled quantities, for example normalised quantities. In the case of a metric that is a representation of a trajectory of the phaseon, then the scaling may be any linear or nonlinear operation, for example a translation of the trajectory so that it originates, or has a mean position, in the centre of an image of the trajectory, or for example a scaling the trajectory in space by a multiplier.

Figure 9:
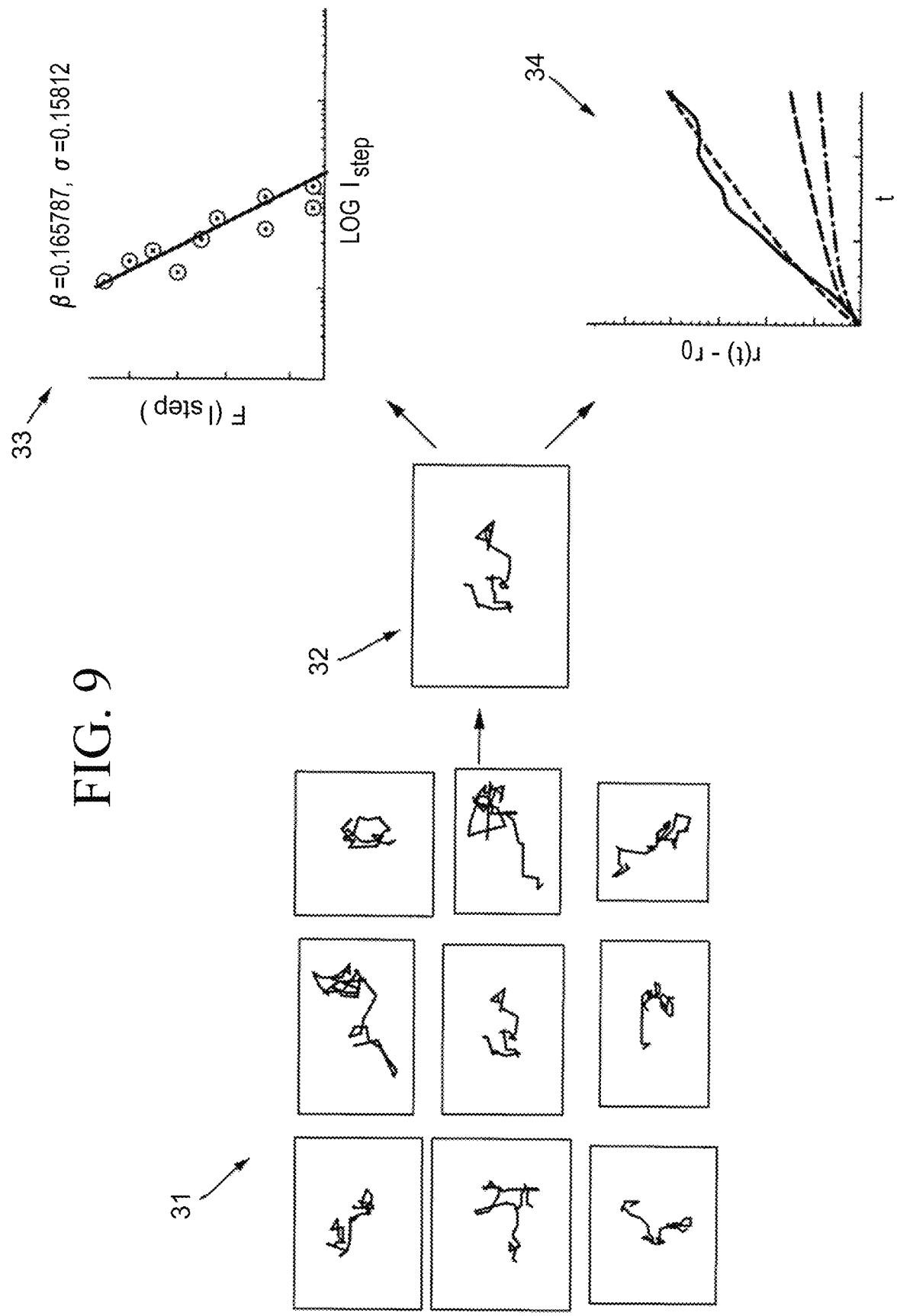
FIG. 9 is a diagram showing example trajectories of particles represented by the input data and examples of two metrics derived for one of the particles.

FIG. 9 illustrates some example trajectories metrics derived therefrom for the illustrative example of FIG. 2 where the physical system is a plasma of a metal driven by a high-power laser. In particular, FIG. 9 shows representations 31 of nine example space trajectories of phaseons in the system. As in FIG. 2, each trajectory is represented by the time-series of positions of the phaseon, where time is labelled appropriately. Although not visible in FIG. 4 due to being a black-and-white drawing, the time (corresponding to different points along the trajectory) can be denoted by different shadings or colours in a displayed representation.

FIG. 9 also shows a representation 32 of an example of the trajectory of one phaseon, enlarged to show detail, as well as two graphs 33, 34 which illustrate the example metrics of the trajectory shown in that representation 32. The graph 33 shows a metric that is the frequency distribution (F(Istep)) of path-lengths (Istep) of the straight-line displacements of the phaseon, the path-lengths (Istep) being plotted on a logarithmic scale. The graph 34 shows the time-rate of the phaseon's displacement from its initial position in configuration space $(r(t)-r_0)$. Such metrics are derived for all the phaseons.

Reverting to the method of FIG. 7, in step T2 a classification of the phaseons is performed. The classification classifies the phaseons into plural classes. The classes into which the phaseons are classified may correspond to different types of dynamical process acting in the dynamical physical system. Classification data 23 representing the classification is output.

In the method of FIG. 7, the classification performed in step T4-2 applies a supervised machine learning technique that operates on the feature vectors 22 of the phaseons.

The classification of step T4-2 may be trained in step T4-3 using example data 24 that comprises feature vectors of training examples of phaseons in respective classes. Step T4-3 is performed as a preliminary step prior to performing the classification in step T4-2. Thus, step T4-3 may be performed contemporaneously with the rest of the method, for example in the same computer apparatus in which case step T4-3 may be implemented in a module of the same computer program as the remainder of the method. Alternatively, step T4-3 may be performed in advance. In that case, step T4-3 may be implemented in a separate computer program from steps T4-1 and T4-2.

The supervised machine learning technique may be of any known type. Such supervised machine learning is the machine learning task of inferring a function from example data that is a set of examples in known classes (sometimes referred to as being "labelled"). In supervised machine learning, each example is a pair consisting of a feature vector and a desired class (sometimes referred to as "the supervisory signal"). A supervised learning technique analyses the example data and produces an inferred function, which can be used for mapping new examples. The inferred function is used in the classification of step T4-2. An optimal scenario will allow for the algorithm to correctly determine the class labels for unseen instances. This requires the learning algorithm to generalize from the training data to unseen situations.

Many supervised machine learning techniques are known and may be applied here. Non-limitative examples of such methods are Support Vector Machines, linear regression, logistic regression, neural networks, random forest and nearest neighbour methods.

The supervised machine learning technique may employ a scoring function, such as a distance function, as a measure of similarity between feature vectors.

The supervised machine learning technique may be probabilistic. Non-limitative examples of such are techniques are naive Bayes and linear discriminant analysis which use joint probability models, and logistic regression which uses a conditional probability model.

The supervised machine learning technique may be use empirical risk minimization or structural risk minimization. Empirical risk minimization seeks the function that best fits the example data 24. Structural risk minimize includes a penalty function that controls the bias/variance trade-off.

The example data 24 comprises feature vectors of training examples of phaseons in respective classes. To provide classes that correspond to different types of dynamical process acting in the dynamical physical system under study, the training examples may be examples of phaseons that are characteristic of the dynamical process of interest. As a result, the classes into which the phaseons are classified in step T4-2 intrinsically correspond to the dynamical processes of which the training examples are characteristic, this relationship being shown schematically in FIG. 7 by the dotted line between the example data 24 and the classification data 23. In that manner, the classification of the phaseons effectively provides a global snapshot of those dynamical processes acting in the dynamical physical system. The relative proportion of phaseons in each class provides a comprehensive description of the dynamical physical system.

Figure 10:
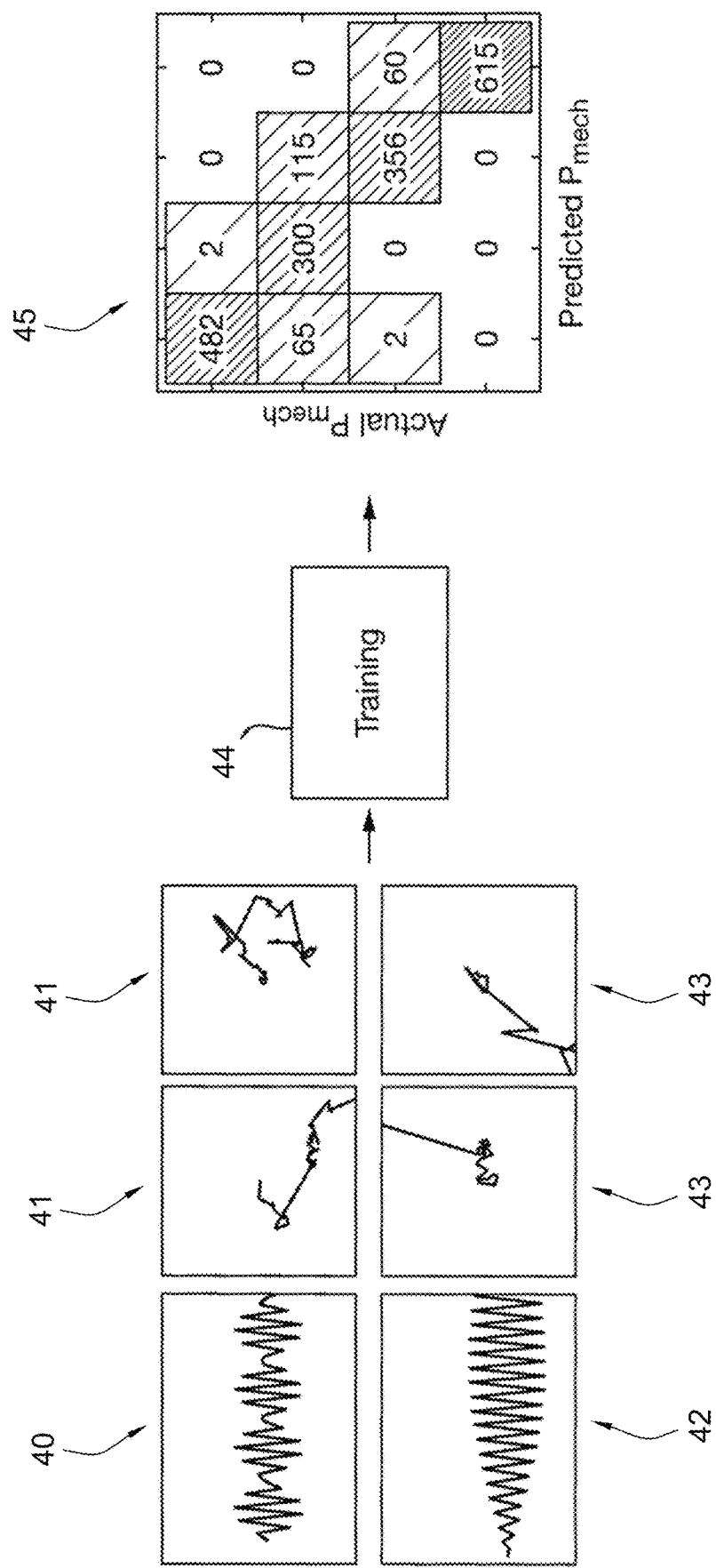
FIG. 10 is a diagram showing some trajectories example trajectories of particles that are training examples for a supervised machine learning training and a resultant confusion matrix used in the training.

The example data 24 may typically represent a large number of phaseons. The example data 24 may be constructed from randomized instances of prototypical classes of phaseons undergoing topical dynamical processes. Non-limitative examples of classes of phaseons represented by the example data 24 include:
  Wave packets
  Gaussian wave envelopes
  Sinusoidal (i.e. plane wave) motion
  Linear motion
  Chaotic motion
  Multi-phaseon coupled motion
  Resonant motion
  Stochastic differential generating processes, for example Brownian processes, sub-diffusive processes and/or super-diffusive processes FIG. 10 illustrates some examples of the example data 24 applicable to the illustrative example of FIG. 2 where the dynamical statistical system is a physical system is a plasma of a metal driven by a high-power laser. In particular, FIG. 10 shows a representation 40 of a wave packet and illustrative representations 41 of example data 24 for examples that are wave packets. FIG. 10 also shows a representation 42 of a Gaussian waves envelope and illustrative representations 43 of example data 24 for examples that are Gaussian waves envelopes.

Figure 11:
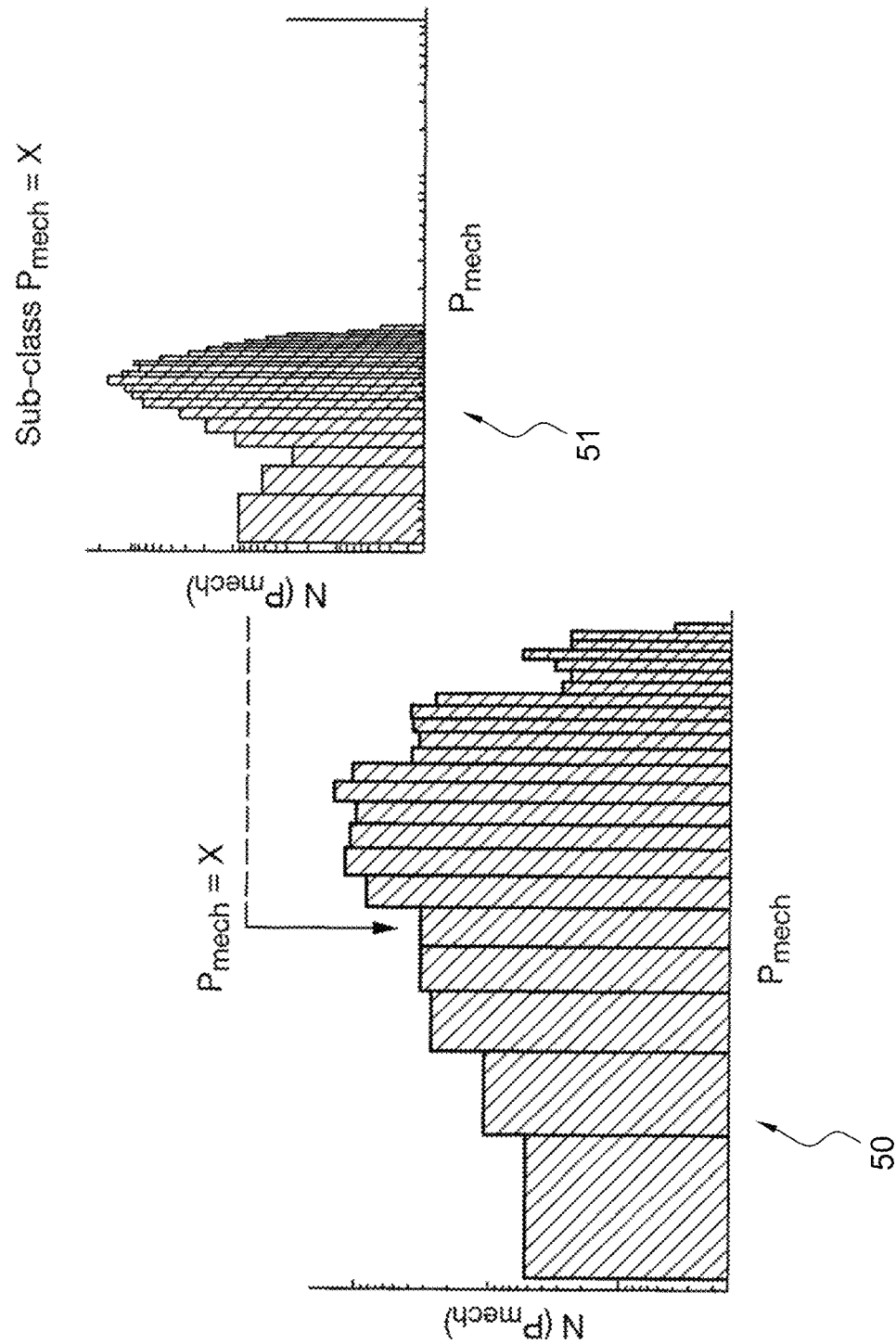
FIG. 11 is a diagram showing an example of bar charts of the distribution of particles in the classes represented by derived classification data at two levels of granularity.

FIG. 11 illustrates the training method 44 using a supervised machine learning technique that generates and optimises a confusion matrix 45 using an iterative technique. The confusion matrix shown in FIG. 11 contains example results. The confusion matrix 45 has rows with indices actual $P_{mech}$ corresponding to the classes of the example data 24 and columns with indices predicted $P_{mech}$ corresponding to the classes that are predicted. In this type of example, the training optimises the confusion matrix 45 to increase the number of correctly predicted classes, i.e. to increase the numbers along the diagonal of the confusion matrix.

The classification data 23 may be used in various manners.

Optionally, the classification data 23 may be used by performing step T4-4. In step T4-4 a graphical representation of the distribution of phaseons in the classes is generated and displayed. Such a graphical representation may be for example a straightforward bar chart showing the classes number of phaseons in each class, i.e. the relative frequency of each class. The graphical representation can be presented and interrogated using conventional tools, for example by displaying with varying levels of granularity, to allow drilling down to see additional detail, thereby enabling a more comprehensive understanding of the material response.

Figure 12:
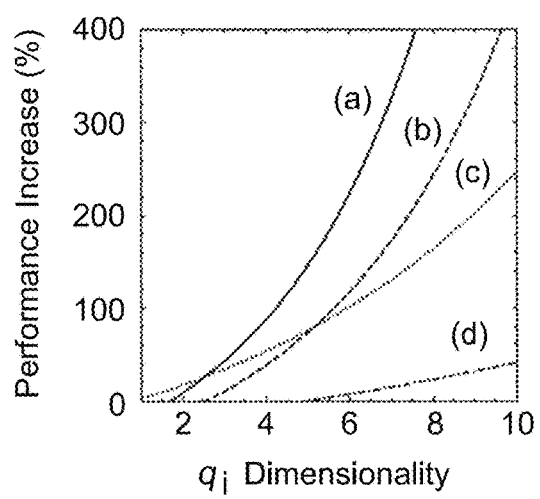
FIG. 12 is a graph illustrating the improved performance of the present methods.

FIG. 12 illustrates an example of a graphical representation in the form of a bar chart that may be generated in step T4-4 for the illustrative example of FIG. 3 where the physical system is a plasma of a metal driven by a high-power laser. In FIG. 12, the horizontal axis shows the classes corresponding to of dynamical processes present labelled by indices $P_{mech}$ and the vertical axis corresponds to the number of phaseons $N(P_{mech})$ in each class $P_{mech}$, i.e. the frequency of each of those processes. To illustrate representation of the classification data 23 with varying levels of granularity, FIG. 12 includes a main plot 50 showing the overall distribution using a broad classification, and an inset plot 51 showing the distribution of a single bar in the main plot 50, so as to show details of classes of dynamical process that are sub-classes of a class of the broad classification in the main plot 50. In this manner, the graphical representation enables a comprehensive understanding of the material response.

Where the input data 21 represents the dynamical physical system over successive intervals in time, as the method is performed on the input data 21 in respect of each interval of time, the classification data 23 that is output represents the classification of the phaseons into the plural classes in respect of each interval of time. As a result, the classification data 23 characterises the evolution of the dynamical physical system over the successive intervals of time, for example on relative flows of energy and momentum in the dynamical processes. This information on the temporal evolution of the dynamical physical system provides additional power to the characterisation of the dynamical physical system.

The method of FIG. 8 will now be described. By way of comparison, the method of FIG. 8 is in general terms the same as the method of FIG. 7 except that the classification performed in step T4-2 uses an unsupervised machine learning technique, instead of a supervised machine learning technique. Accordingly, corresponding steps and elements use the same reference numerals and the description of the method of FIG. 7 above applies equally to the method of FIG. 8, except for the changes described below.

In the method of FIG. 8, the input data 21 and step T4-1 are the same as in the method of FIG. 7 with the result that the feature vectors 22 are also the same.

In step T4-2, a classification of the phaseons is performed. The classification classifies the phaseons into plural classes. Classification data 23 representing the classification is output. However, the classification performed in step T4-2 applies an unsupervised machine learning technique that operates on the feature vectors 22 of the phaseons. The machine learning technique compares the feature vectors 22 of the phaseons as between different phaseons. The feature vectors 22 are classified on the basis of the comparison. Thus, the classes are identified from the features vectors 2 themselves. Thus, the method of FIG. 8 does not perform the training of step T4-3.

The unsupervised machine learning technique may be of any known type. In an unsupervised machine learning approach, a scoring function, for example an established distance function, such as a Levenshtein function, is used to compare the feature vectors and identify the classes. In general, in unsupervised machine learning, the problem is to find hidden structure in unclassified (unlabelled) data. Unsupervised learning is closely related to the problem of density estimation in statistics and may use related techniques. However, applicable unsupervised machine learning also includes many other techniques that seek to identify classes within the data.

Many unsupervised machine learning techniques are known and may be applied here. Non-limitative examples of such methods are techniques that use clustering (for example k-means, mixture models, hierarchical clustering), and techniques for learning latent variable models, such as Expectation-Maximization algorithm (EM), method of moments or blind signal separation techniques (for example principal component analysis, independent component analysis, non-negative matrix factorization or singular value decomposition).

Due to the choice of metrics used in the feature vectors 22, such unsupervised machine learning techniques identifies germane classes, as well as performing the classification of individual phaseons. The relative proportion of phaseons in each class thus provide a comprehensive description of the dynamical physical system. The classes may correspond to dynamical processes acting in the dynamical physical system, thereby allowing identification of dynamical processes that are significant in the dynamical physical system.

As the machine learning technique is unsupervised, the physical significance of the classes and any relationship with dynamical processes is not intrinsically known. This contrasts with the supervised machine learning technique used in FIG. 7. However, it may in fact provide an advantage in allowing the recognition of types of dynamical processes that were not previously considered and that otherwise might not have been identified. Thus, the classes of phaseons represented by the classification data 23 may be studied to identify dynamical processes to which they relate. This study may be performed by the user, or the method may include steps that assist the user.

By way of example of a step to assist the user, the method of FIG. 8 may optionally include step T4-5 which is performed as follows. In step T4-5, the group of phaseons in each class is related to a respective dynamical process by comparing the feature vectors of the phaseons with example data 24. This example data 24 takes the same form as in the method of FIG. 7. That is the example data 24 comprises feature vectors of training examples of phaseons in respective classes that are characteristic of respective dynamical processes of interest. The comparison may use known techniques, for example using a scoring function, such as an established distance function, such as a Levenshtein function. Thus, the comparison with the example data 24 allows the classes to be related to the dynamical processes of interest of which the example data 24 is characteristic.

Thus, the classification data 23 that is output characterises the dynamical physical system.

In the method of FIG. 8, step T4-4 may optionally be performed as in the method of FIG. 7. Steps S4 and S5 may be performed in either order or in parallel.

Applying this method yields substantially superior characterisation of the dynamical physical system that allows identification of significant dynamical processes that govern the response of the system to non-equilibrium forcing functions and influences. This may in turn be used to study and optimize those dynamical processes.

The method described herein improves the performance of the machine learning performed in step T4 and characterization of dynamical statistical systems, both physical and non-physical in nature. Such improvements, include but are not limited to the following.

Advantage is provided by both the encoding by phaseons and the use of a field 4 in the effective configuration space, being either or both of (a) a moment field in either a Eulerian or Lagrangian representation or (b) a forcing-field to provide input data 1 for a machine learning architecture, or multiple architectures. This can convey substantial performance increase because each constructed data type may be well suited to different machine learning architectures. By way of example, a convolutional ANN may be well suited to capturing latent large-scale features in a Eulerian representation, whereas a recurrent ANN may be well suited to deriving information from the phaseon data.

The feature vectors involved in statistical machine learning characterization are enhanced by the present invention in the following non-exhaustive manners:
  a. Combinatorial approaches using Lagrangian macro properties of a fluid element together with phaseon attribute(s).
  b. Use of either constructed moment representation(s), and/or the effective forcing-field, to generate, label, and/or segment regions of the dataset by common attributes, thereby linking phaseon, or particle in the physical system case, "micro" attributes to moment attributes.
  c. Calculating a hash (i.e., signature) value associated with a segmented or non-segmented Eulerian region and associating this to Lagrangian or phaseon properties.
  d. A multi-step process of (1) identification of "anomalous" regions in the constructed data representations or effective forcing-field in a static or spatio-temporally varying manner; and (2) adding an entry to phaseon (or in the physical case, particle) feature vectors which classify such anomalous regions.

Encoding of the distribution function 2 using phaseons provides an efficient unified representation of multiple different dynamical statistical systems. Therefore the problem of hyperparameter optimization of machine learning systems is reduced in difficulty by virtue of have to address the problem in a smaller multiplicity of circumstances and data formats. This generality of use vastly increases the types of data set which can be efficiently processed, thereby providing substantially improved performance of the machine learning technology in providing system characterization.

To illustrate these advantages, FIG. 12 illustrates example quantifications of the performance increase of machine learning and characterization of dynamical statistical systems associated with the present method relative to standard machine learning approaches. Performance increase arises partially due to the increased quantity of data generated by the methods covered in the present invention compared to the quantity of data input into the methods which can capture latent information contained in the data. The curves in FIG. 12 are modelled using uniform data quality while varying the number of "macro" moments generated by the method: (a) 2, (b) 2, (c) 1, (d) 1; the scaling exponent associated with data quantity: (a) 0.02, (b) 0.025, (c) 0.015, (d) 0.015; the quantity of data initially input into the methods: (a) 1e10, (b) 1e10, (c) 1e3, (d) 1e3 in a.u.; and the average generalized configuration space mesh size normalized to the domain of that coordinate which is used to produce the dual representations and phaseon forcing-field: (a) 1e6, (b) 1e4, (c) 1e4, (d) 1e2. The present invention is thus seen to convey strongly increased performance which scales with the dimensionality of the input data 1.

The invention claimed is:
1. A method of performing machine learning on a data set representing a dynamical statistical system of entities having plural primary variables that vary with time, the entities comprising one or more species,
  the method treating the primary variables as dimensions in an effective configuration space, and treating secondary variables that are dependent on a rate of change of each of the primary variables as variables in an effective momentum space, and treating the effective configuration space and the effective momentum space together as a phase space, the method comprising, with respect to each of the one or more species of the entities:

providing a set of training feature vectors corresponding to training examples of phaseons in a plurality of classes;

training a machine learning architecture to perform classification based, at least in part, on the training feature vectors;

deriving a distribution function over time of a density of entities in the phase space;

encoding the distribution function as a sum of contour functions over time describing the contour in phase space of plural phaseons which are entities of a model of the dynamical statistical system that are localised in the phase space; and performing, using the machine learning architecture, machine learning on the encoded distribution function or at least one field in the effective configuration space derived from the encoded distribution function, with respect to each of the one or more species of the entities;

wherein:

feature vectors are derived for the plural phaseons based, at least in part, on the encoded distribution function or the at least one field in the effective configuration space; and the machine learning performs classification of the plural phaseons into one or more of the plurality of classes using the feature vectors.

2. The method of claim 1, further comprising deriving from the encoded distribution function at least one moment field in the effective configuration space representing a quantity in a Eulerian or Lagrangian representation derived by integration of the encoded distribution function over the effective momentum space, said machine learning being performed on the at least one moment field.

3. The method of claim 2, wherein said at least one moment field representing a quantity in a Eulerian representation and said at least one moment field representing a quantity in a Lagrangian representation.

4. The method of claim 3, further comprising deriving from the encoded distribution function a forcing field in the effective configuration space representing a quantity which is dependent on the rate of change of the secondary variables, said machine learning being performed on the at least one moment field.

5. The method of claim 1, wherein a number of the plural phaseons is less than the number of entities of the dynamical statistical system.

6. The method of claim 1, wherein the contour functions are one of delta functions, Gaussian functions or Heaviside functions.

7. The method of claim 1, wherein the step of performing machine learning comprises:

deriving a feature vector in respect of each phaseon comprising plural metrics that are derived from the encoded distribution function or from the at least one field in the effective configuration space;

performing classification of the plural phaseons into plural classes by applying a machine learning technique that operates on the feature vectors; and outputting classification data representing the classification.

8. The method of claim 7, wherein the plural metrics include metrics that are values of the at least one field in respect of the phaseon.

9. The method of claim 8, wherein the plural metrics include one or more metrics that describe a change in a phase space state of the phaseon over time.

10. The method of claim 9, wherein the plural metrics include one or more metrics that describe motion of the phaseon in the phase space.

11. The method of claim 9, wherein the plural metrics include one or more metrics that describe a position and/or time of an event related to a change in energy of a particle.

12. The method of claim 1, wherein the machine learning is a supervised machine learning technique trained using the set of training feature vectors associated with the training examples of phaseons in respective classes, or an unsupervised machine learning technique that compares the feature vectors derived from the plural phaseons with the training feature vectors.

13. The method of claim 1, wherein the dynamical statistical system of entities represented by the data set is a physical system.

14. The method of claim 13, wherein the dynamical statistical system of entities represented by the data set is a dynamical physical system of particles.

15. The method of claim 13, wherein the data set is derived from physical measurements of a dynamical physical system, or is derived from the output of a numerical simulation.

16. The method of claim 1, wherein the dynamical statistical system of entities represented by the data set is a not a dynamical physical system of particles.

17. The method of claim 1, wherein:

the dynamical statistical system is a dynamical physical system of particles;

the data set is derived from physical measurements of a dynamical physical system or from the output of a physical particle simulation;

the configuration space represents a real third-dimensional space;

the primary variables represent positions of the particles in the real third-dimensional space;

the machine learning classifies the particles into different classes relating to dynamical processes acting in the dynamical physical system.

18. A system of performing machine learning on a data set representing a dynamical statistical system of entities comprising one or more species and having plural primary variables that vary with time, the system comprising:

a computing device that includes a computer-readable storage medium storing a computer program, the computer program being configured to cause the computer apparatus to:

execute a method which treats the primary variables as dimensions in an effective configuration space, which treats secondary variables that are dependent on a rate of change of each of the primary variables as variables in an effective momentum space, and which treats the effective configuration space and the effective momentum space together as a phase space, with respect to each of the one or more species of the entities:

providing a set of training feature vectors corresponding to examples of phaseons in a plurality of classes;

training a machine learning architecture to perform classification based, at least in part, on the training feature vectors;

derive a distribution function over time of a density of entities in the phase space;

encode the distribution function as a sum of contour functions over time describing the contour in phase space of plural phaseons which are entities of a model of the dynamical statistical system that are localised in the phase space; and perform, using the machine learning architecture, machine learning on the encoded distribution function or at least one field in the effective configuration space derived from the encoded distribution function, with respect to each of the species of the entities;

wherein:

feature vectors are derived for the plural phaseons based, at least in part, on the encoded distribution function or the at least one field in the effective configuration space; and the machine learning performs classification of the plural phaseons using the feature vectors.

19. The system of claim 18, wherein the the encoded distribution function is used to derive at least one moment field in the effective configuration space representing a quantity in a Eulerian or Lagrangian representation derived by integration of the encoded distribution function over the effective momentum space, said machine learning being performed on the at least one moment field.

20. The system of claim 19, wherein said at least one moment field representing a quantity in a Eulerian representation and said at least one moment field representing a quantity in a Lagrangian representation.

21. The system of claim 20, wherein the encoded distribution function is further used to derive a forcing field in the effective configuration space representing a quantity which is dependent on the rate of change of the secondary variables, said machine learning being performed on the at least one moment field.

* * * * *